United States Patent
Karol et al.

(10) Patent No.: US 10,858,197 B2
(45) Date of Patent: Dec. 8, 2020

(54) COLLAPSIBLE PRODUCT MOVER

(71) Applicant: Cornerstone Automation Systems, LLC, Frisco, TX (US)

(72) Inventors: Tom Karol, Frisco, TX (US); Richard Steele, Frisco, TX (US); Darian Carr, Frisco, TX (US); Ikram Khan, Frisco, TX (US); Ben O'Brien, Omaha, NE (US); Jason Bellar, Bella Vista, AR (US)

(73) Assignee: Cornerstone Automation Systems, LLC, Frisco, TX (US)

( * ) Notice: Subject to any disclaimer, the term of this patent is extended or adjusted under 35 U.S.C. 154(b) by 0 days.

(21) Appl. No.: 16/714,513

(22) Filed: Dec. 13, 2019

(65) Prior Publication Data

US 2020/0189853 A1    Jun. 18, 2020

Related U.S. Application Data

(60) Provisional application No. 62/779,218, filed on Dec. 13, 2018.

(51) Int. Cl.
| | |
|---|---|
| *B65G 13/12* | (2006.01) |
| *B65G 21/10* | (2006.01) |
| *B65G 39/12* | (2006.01) |
| *B65G 41/00* | (2006.01) |

(52) U.S. Cl.
CPC ........... *B65G 41/002* (2013.01); *B65G 39/12* (2013.01); *B65G 2207/30* (2013.01)

(58) Field of Classification Search
CPC ...... B65G 21/10; B65G 39/12; B65G 41/002; B65G 13/12

USPC ............ 198/538, 539, 860.2, 861.1, 861.2; 193/35 R, 35 F

See application file for complete search history.

(56) References Cited

U.S. PATENT DOCUMENTS

| | | | | |
|---|---|---|---|---|
| 1,441,851 | A | | 1/1923 | Hartley |
| 2,219,926 | A | | 10/1940 | Jensen |
| 2,993,583 | A | * | 7/1961 | Sykes ................... B65G 47/54 198/370.07 |
| 4,192,496 | A | * | 3/1980 | Baselice ................ B65H 1/263 198/463.3 |
| 5,172,804 | A | * | 12/1992 | Chersin ................. B65G 13/12 198/346.1 |
| 5,443,351 | A | * | 8/1995 | Pettijohn .................. B60P 1/36 198/632 |
| 5,568,857 | A | * | 10/1996 | Chen ..................... B65G 13/12 198/581 |
| 5,875,883 | A | * | 3/1999 | Ertel ...................... B65G 15/42 198/821 |

(Continued)

*Primary Examiner* — Douglas A Hess

(57) ABSTRACT

Embodiments and features of a product moving system are disclosed herein. In one embodiment, a collapsible product mover comprises a first portion having proximal and distal end, and a top side and a bottom side; a second portion having a proximal and distal end, and a top side and a bottom side, wherein the proximal end of the second portion coupled with the distal end of the first portion; and a support structure beneath at least the first portion; wherein the first and second portions are configured to move between an open position and a folded position, wherein in the folded position the top side of the first portion faces the top side of the second portion.

20 Claims, 7 Drawing Sheets

(56) References Cited

U.S. PATENT DOCUMENTS

| | | | |
|---|---|---|---|
| 6,708,814 B2* | 3/2004 | Wagstaffe | B65G 21/14 198/581 |
| 6,719,119 B1* | 4/2004 | Hendzel | B65G 13/12 193/35 TE |
| 7,090,060 B1 | 8/2006 | Whitney | |
| 7,273,150 B2* | 9/2007 | Fridman | B07B 1/005 198/313 |
| 7,641,043 B2* | 1/2010 | Vestergaard | B64D 9/00 193/35 R |
| 8,074,792 B2* | 12/2011 | Webb | B65G 19/287 198/861.2 |
| 10,232,409 B2* | 3/2019 | Dugat | B07C 5/36 |
| 2020/0122928 A1* | 4/2020 | Bellar et al. | |

* cited by examiner

# COLLAPSIBLE PRODUCT MOVER

CROSS-REFERENCE TO RELATED APPLICATION

This application claims the benefit of U.S. Provisional Application Ser. No. 62/779,218, filed by Tom Karol, et al. on Dec. 13, 2018, entitled "COLLAPSIBLE PRODUCT MOVER," commonly assigned with this application and incorporated herein by reference in its entirety.

TECHNICAL FIELD

This application is directed to product transfer, sorting and movement devices, and in particular a collapsible product mover, which may be used in a product sorting, transfer, and movement system.

BACKGROUND

The retail industry has transformed rapidly over the last two decades. The e-commerce industry continues to grow, but "brick and mortar" retail has seen a decline. As a result, the traditional retail companies have had to redefine their business models to adapt to the changing market trends in order to stay competitive. The retail warehouses, which once served merely to hold inventory have now evolved into a more dynamic entity. A retail warehouse is expected to perform the functions of an automated fulfillment center. The added functions of the retail center drive the need for more purpose-oriented automation equipment.

Product receiving, scanning, sorting/distribution, and movement are some of the basic steps performed in a retail warehouse. Some dedicated equipment may perform each of these tasks, but in certain facilities, there may be space limitations.

BRIEF DESCRIPTION

Reference is now made to the following descriptions taken in conjunction with the accompanying drawings (wherein some are also included within the specification), in which.

DETAILED DESCRIPTION

Figure 1:
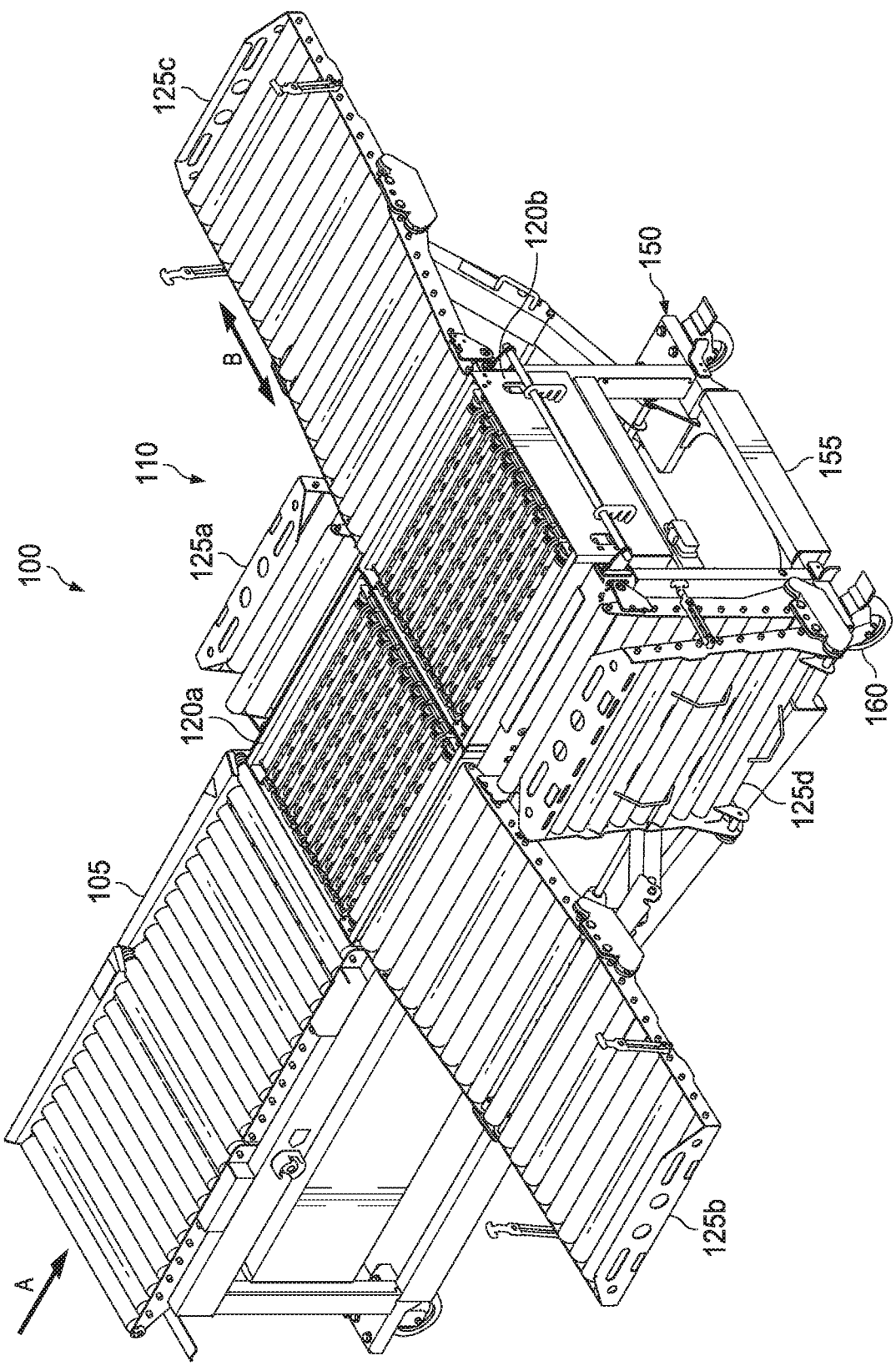
FIG. 1 illustrates a product transfer and sortation system employing collapsible product movers constructed according to the principles of the present disclosure.

In the drawings and descriptions that follow, like parts are typically marked throughout the specification and drawings with the same reference numerals, respectively. The drawn figures are not necessarily to scale. Certain features of the disclosure may be shown exaggerated in scale or in somewhat schematic form and some details of certain elements may not be shown in the interest of clarity and conciseness. The present disclosure may be implemented in embodiments of different forms. Specific embodiments are described in detail and are shown in the drawings, with the understanding that the present disclosure is to be considered an exemplification of the principles of the disclosure, and is not intended to limit the disclosure to that illustrated and described herein. It is to be fully recognized that the different teachings of the embodiments discussed herein may be employed separately or in any suitable combination to produce desired results.

Unless otherwise specified, use of the terms "connect," "engage," "couple," "attach," or any other like term describing an interaction between elements is not meant to limit the interaction to direct interaction between the elements and may also include indirect interaction between the elements described. Substantially the same height, plane, or substantially level as used herein means, in some embodiments, within about 0-5 degrees of the same plane. When used with respect to a processor or controller, "configured to" is interpreted as constructed to and/or designed to perform a designated instruction, task, or function. The description and drawings included herein merely illustrate the principles of the disclosure. It will thus be appreciated that those skilled in the art will be able to devise various arrangements that, although not explicitly described or shown herein, embody the principles of the disclosure and are included within its scope.

Disclosed herein are aspects of a collapsible product mover that may be used with product transfer and sortation systems. Such systems may be used in warehouses, factories, and various places where product moving and sorting are needed. Collapsible/folding portions of the product movers allow for easier storage of product movement and sortation modules. Some embodiments may employ a pivoting design on the product mover which may facilitate a higher load capacity and provide better resistance to bending from cantilever loading on the product mover.

Automation equipment manufacturers desire to design and build compact equipment that can fit into limited space confines of certain workspaces, such as a retail warehouse, and yet are portable enough to be moved around to make optimum use of the available floor space. Presented herein are aspects of an automated sortation and product movement system and collapsible product movers that may be used in various spaces, including limited space environments.

Referring to FIG. 1, there is shown a product sortation and moving system 100. In this embodiment, the system 100 includes at least one incoming conveyor 105 and a sorting and transfer system 110 arranged in series. In some embodiments, the system 100 may include a product identification system, such as, e.g., a scanner (not shown) before or coupled with the at least one incoming conveyor 105. The scanner may be a bar code scanner, and in some other embodiments, may be a scanning and sorting module. The at least one incoming conveyor 105 receives product from upstream conveyors connected directly to a delivery truck, or in some embodiments, products may be placed directly onto the at least one incoming conveyor 105. The product then moves through the scanner, which may identify the product and then determine the direction in which the product needs to be redirected in order to be stored at desired location. In some embodiments, the products may be identified based on a product packaging, a bar code, or other identifying tools located on the product which may be used to identify a specific product. The scanner communicates with the sorting and transfer system 110 in order for the sorting and transfer system 110 to direct the product along a desired production direction based on the product identifier. The scanner may communicate with and send signals to the sorting and transfer system 110 in some embodiments via a wireless connection, or in some embodiments, may be a wired connection.

The sorting and transfer system 110 may include one or more transfer modules 120a and 120b. The sorting and transfer system 110 may include one or more controllers such that the sorting and transfer system 110 may receive a signal from the scanner or from another source upstream of the transfer modules 120a and 120b for each product and performs a divert and sort function to direct the product to move in a selected direction from one or more of the transfer modules 120a and 120b. In one embodiment, the sorting and transfer system 110 may include one or more controllers for directing movement and sorting of a product according to a signal received from the scanner, and in some embodiments, the transfer modules 120a and 120b may each also include a controller for directing operation of each transfer module according to a signal received from the scanner. The product may then, in some embodiments, move onto one or more collapsible or foldable product movers 125 (125a-125d) which may connect with the transfer modules 120. Each of the transfer modules 120a and 120b may transfer the product in at least 2 flow paths. The first path may be parallel with an incoming product Flow A. The second path B may be substantially perpendicular with Flow A. A product may travel along Flow path B in either direction, either turning "right" or "left" from flow path A. For example, a first product may enter first transfer module 120a and be directed to product mover 125a, a second product may be directed to product mover 125b, and a third product may continue travelling along flow path A to the second transfer module 120b, for direction to either product mover 125c or product mover 125d.

In the embodiment shown, the collapsible product movers 125a-125d are foldable and are coupled onto the sorting and transfer modules 120a and 120b, but there may be other embodiments where the product movers 125a-125d may have independent support structures. Based on the product identifier, the transfer modules 120a-120b will determine onto which of the product movers 125a-125d the product needs to be transferred. In some embodiments, the transfer modules 120a and 120b may include a support base 150, which may include a plurality of legs 155 and wheels 160 for moving the transfer modules within a warehouse or storage facility. The transfer modules 120a and 120b may then be used in various locations, and stored when not in use, thereby providing more flexibility within the facility and available floor space for other operations within the facility when the transfer modules 120a and 120b are not in use.

Each transfer module 120a and 120b includes a first shuttle and a second shuttle which may be nested within each other and configured such that as one of the first or second shuttles is raised to a first plane, at a substantially similar level or height as the plane of incoming conveyor 105, the other shuttle is lowered below the first plane. A cam system may be positioned beneath the first and second shuttles to engage and move the first and second shuttles vertically with respect to each other. The cam system has at least a pair of first cams and a pair of second cams positioned radially about a cam shaft driven by a motor. The first and second cams may be offset from each other, in some embodiments by about 180 degrees. The first cams are configured to engage the first shuttle and the second cams are configured engage the second shuttle. When the first cams engage the first shuttle, the first shuttle is raised up while the second shuttle is lowered. When the second cams engage the second shuttle, the second shuttle is raised up as the first cam is lowered. Embodiments of a transfer module 120 are described in more detail in U.S. application Ser. No. 16/714,261, filed by Tom Karol, et al. on Dec. 13, 2019, entitled "LEVEL RIGHT ANGLE TRANSFER MODULE," incorporated herein by reference.

Figure 2A:
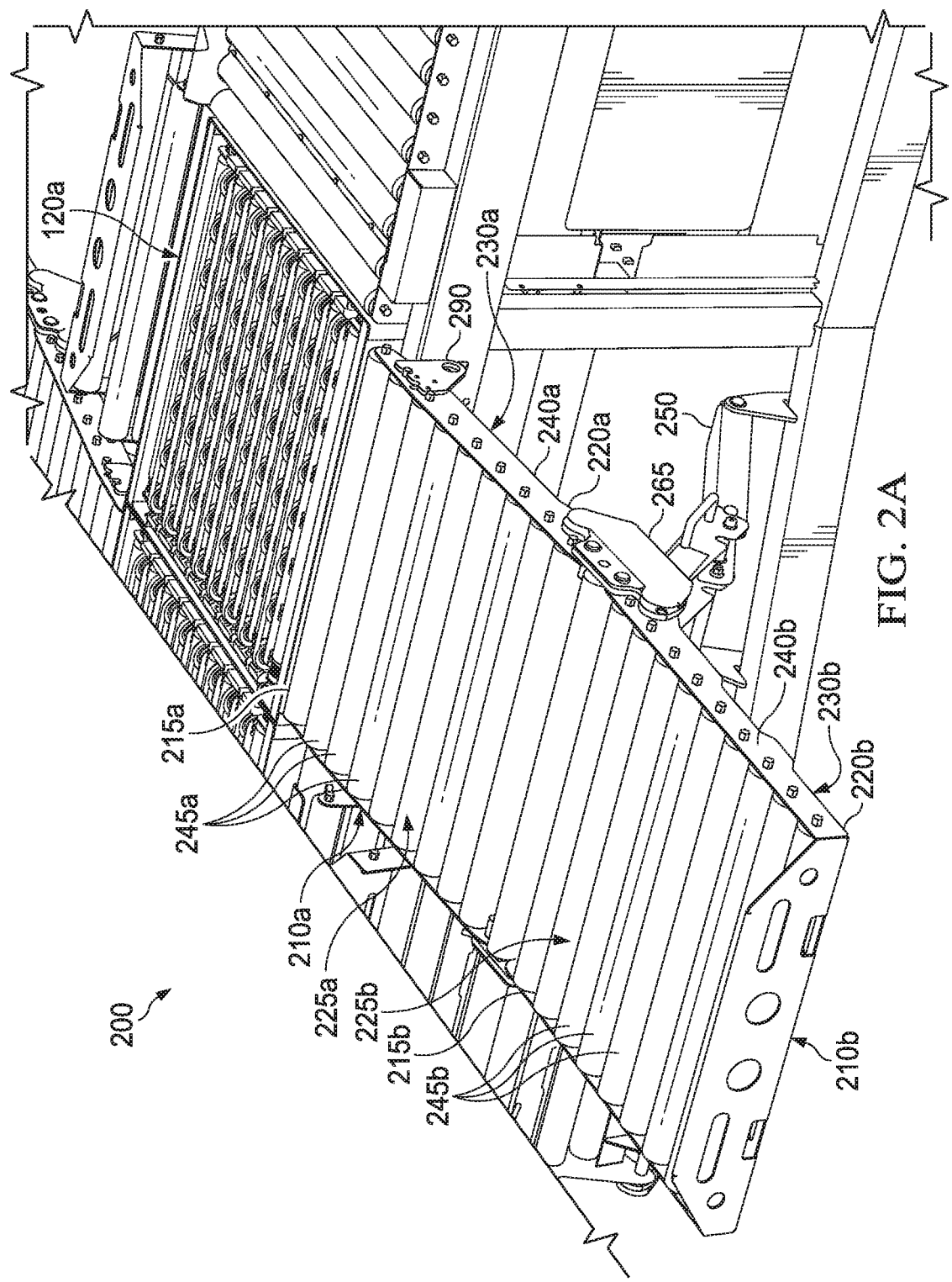
FIG. 2A is perspective view of one embodiment of a collapsible product mover according to according to principles of the disclosure.
Figure 2B:
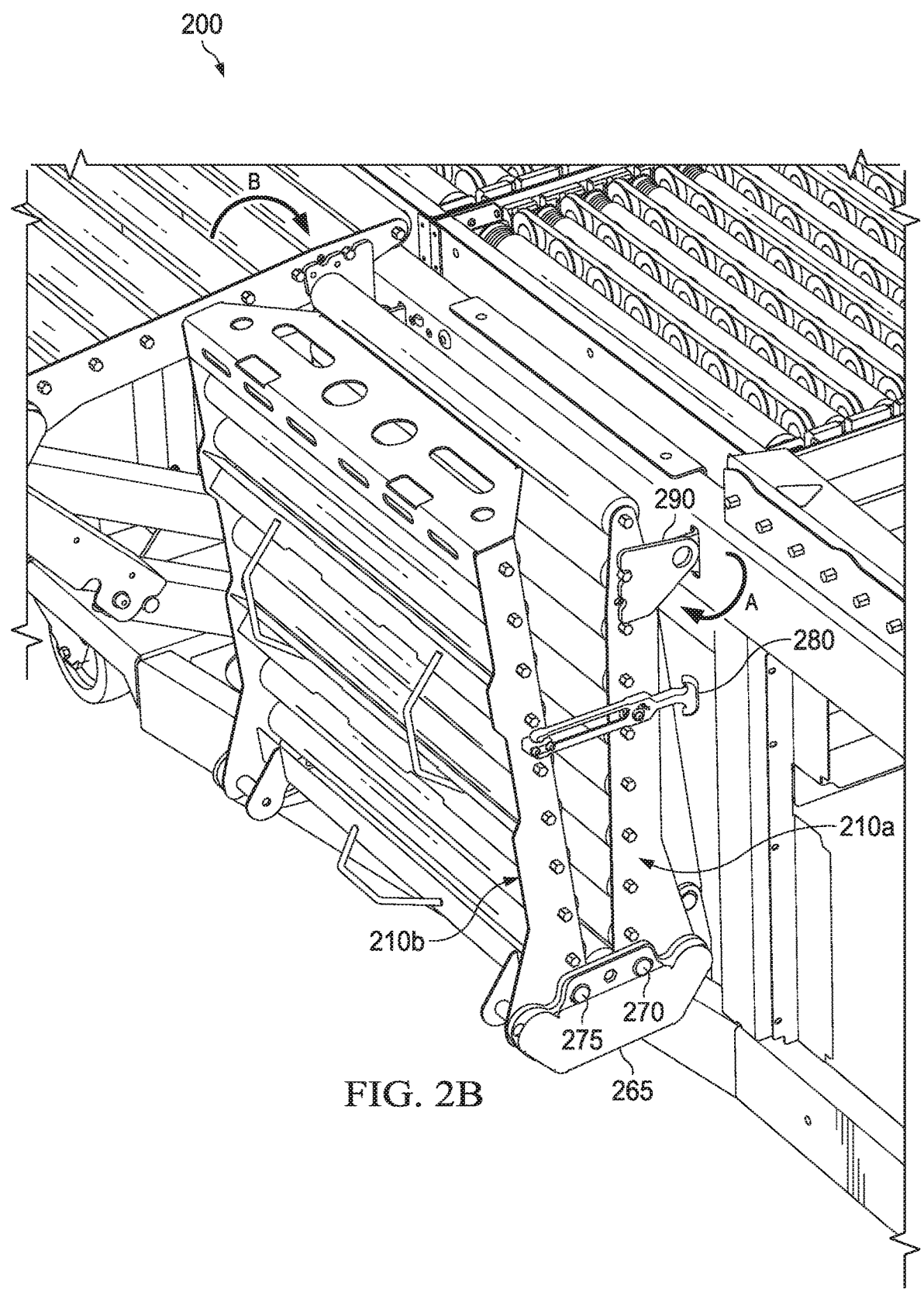
FIG. 2B is a view of the collapsible product mover of 2A shown in a folded position.
Figure 2C:
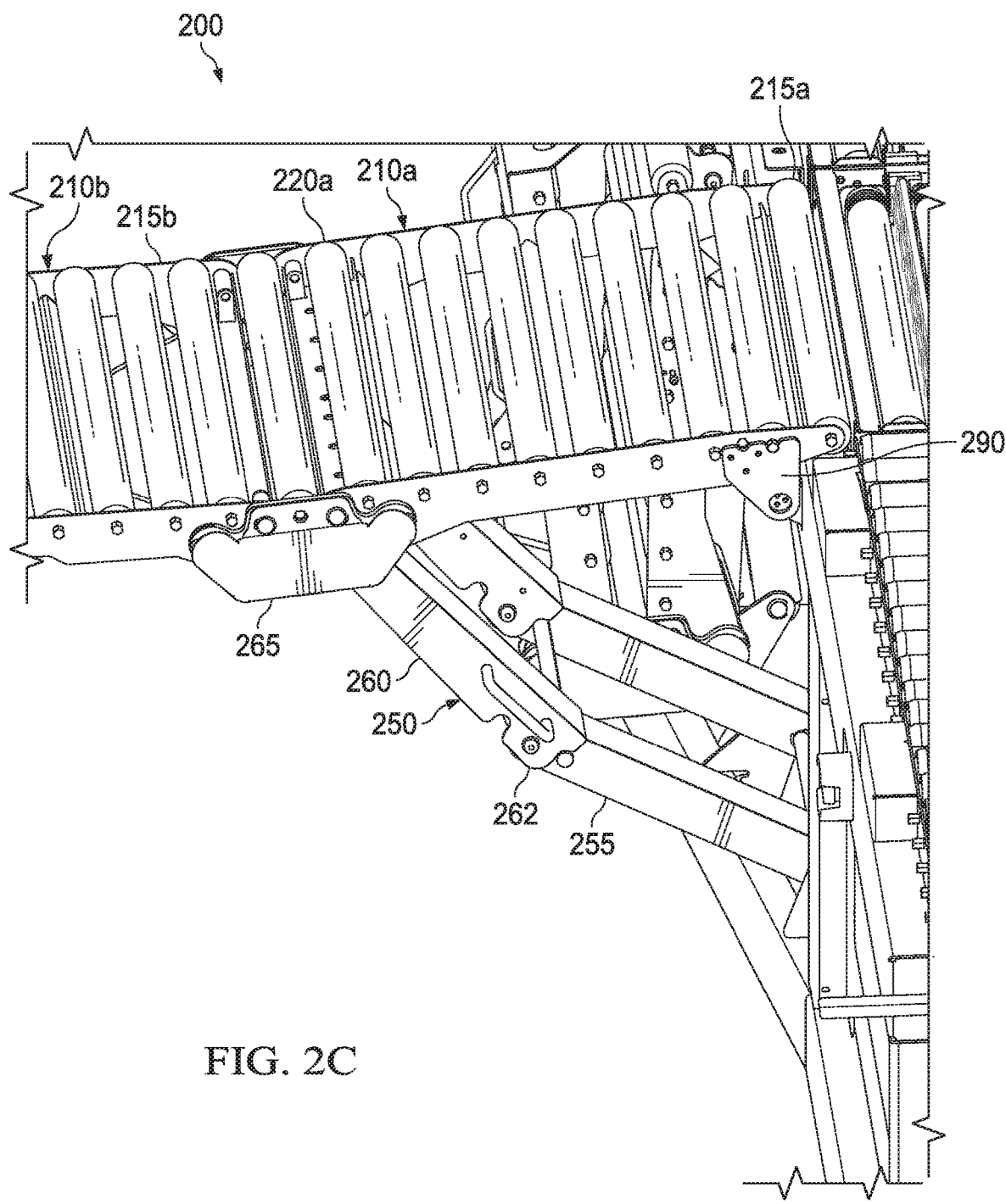
FIG. 2C is another view of the collapsible product mover of 2A, illustrating one embodiment of a support structure for the collapsible product mover according to principles of the disclosure.

Referring now to FIGS. 2A-2C, there is shown one embodiment of a collapsible product mover 200. FIGS. 2A and 2C show the product mover 200 in an open, "in use" position. FIG. 2B shows the product mover 200 in a collapsed or folded position for movement and/or storage of the product mover 200. Referring to FIG. 2A, the product mover 200 may include a first portion 210a and a second portion 210b. Each of the first and second portions 210a and 210b include a proximal end 215a and 215b, a distal end 220a and 220b, a top side 225a and 225b, and a bottom side 230a and 230b. The first and second portions 210a and 210b also include a frame 240a and 240b and in some embodiments, a plurality of rollers 245a and 245b, which may be supported within the frames 240a and 240b. The plurality of rollers 245a and 245b may, in some embodiments, include idle rollers configured to facilitate movement of a product, such as, e.g., a box along a desired direction on the product mover 200. The product mover 200 may couple at one end, in some embodiments, to another product moving and storage component, such as e.g., a product transfer module such as product transfer module 120a or a conveyor, via couplers 290 on both sides of the proximal end 215a. In some embodiments, the product mover 200 may be attached with the product transfer module, such as module 120a, such that the first and second portions 210a and 210b extend from the product transfer module 120a at a slight angle, or in some embodiments, may be substantially level on the same plane as an upper most surface of the module 210a. In some embodiments, the slight angle may be between 0 and 10 degrees. In some embodiments, there may also be a slight angle between the first portion 210a and second portion 210b, which may be between 0 and 10 degrees. As used herein, "substantially level" may be interpreted as within 5-10 degrees of a same plane. Although the embodiments shown illustrate one product move 200 coupled on each side of a transfer module, there may be some embodiments where two or more product movers 200 may be coupled in series together off of the product transfer module 120a.

In some embodiments, each product mover 200 may span a distance of about 10 feet when in the open position. Accordingly, 10 feet may consume valuable space on storage or retail warehouse floor. As such, the product mover 200 may be collapsed or folded into the folded position as shown in FIG. 2B and may then be moved or stored in different locations, or may be mounted to different product moving systems within a warehouse. The ability to move and store the product mover 200 provide a needed versatility for product sorting and handling in warehouse and storage facilities.

Referring now to FIG. 2B, there is shown the product mover 200 in the folded position. As shown, when in the folded position, the top side 225a of the first portion 210a faces the top side 225b of the second portion 210b. The first portion 210a may couple with the second portion 210b, in some embodiments, via a hinge 265. In this embodiment, the hinge 265 is coupled with distal end 230a of the first portion 210*a* at a first pivot point 270 and the proximal end 225*b* of the second portion 210*b* at a second pivot point 275. While not shown, in some embodiments, there may be hinges 265 on both sides the product mover 200. In one embodiment, to open and extend the first and second portions 210*a*-210*b*, the first portion 210*a* is "opened" upward. As shown by arrow A. Once the first portion 210*a* is unfolded, the support structure 250 may be locked into place and the second portion 210*b* may then be unfolded or opened, as shown by arrow B. In some embodiments, a locking mechanism 280 may be used to hold the first and second portions 210*a* and 210*b* together while in the folded position.

Referring now to FIG. 2C, the product mover 200 may be supported beneath by a support structure 250. In the embodiment shown, the support structure 250 is a hinged truss, having at least a first member 255 and a second member 260, coupled together by a hinge 262. The truss may reduce the cantilever loading on the first and second portions 210*a*-210*b* when in the open position. The support legs are designed with the hinge 262 which may be locked in position after opening. In some embodiments, the support structure 250 may couple at one end to another product moving and storage component, such as e.g., a product transfer module or a conveyor. In the embodiment shown, the first member 255 is coupled with a product transfer module and the second member is coupled near the distal end 220*a* of the first portion 210*a*.

Figure 3:
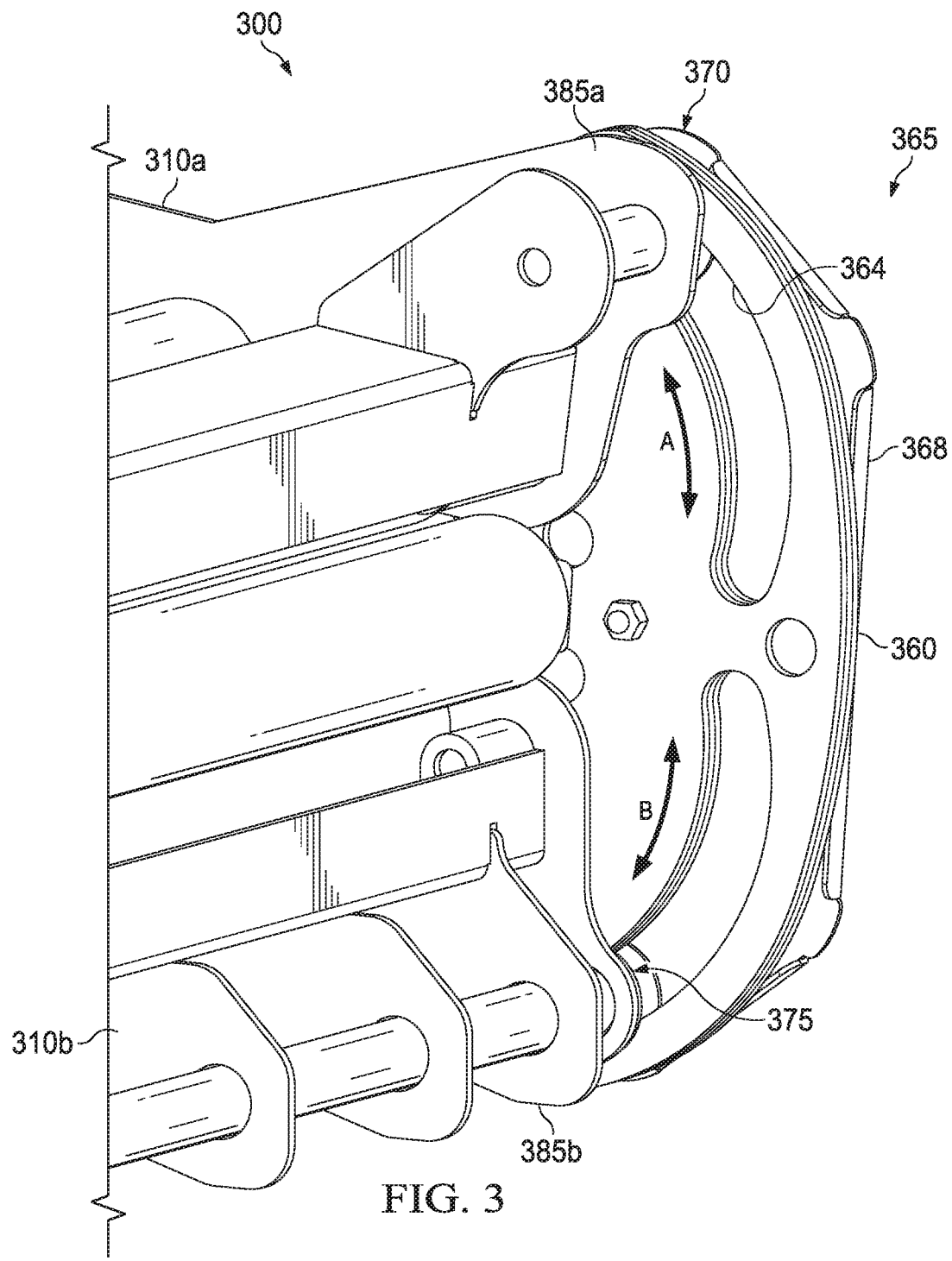
FIG. 3 is a view of a hinge that may be employed with the collapsible product mover according to principles of the disclosure.

Referring now to FIG. 3, there is shown another embodiment of a product mover 300, and more specifically an embodiment of hinge 365 which may be used with the product mover 300 to couple a first portion 310*a* with a second portion 310*b*. The hinge 365 may be a two-point hinge that allows the product mover 300 to fold and unfold between the open position and the folded position. The hinge 365, in some embodiments, includes a body 360 and may include at least two slots 364 which engage pivot points 370 and 375. The slots 364 may be curved slots. The hinge 365 may also include a safety cover 368 to protect against pinching or catching in the slots 364 as the first and second portions 310*a* and 310*b* are opened and closed, following the rotations A and B shown, respectively.

The curved slots 364 allow a path for the mechanical stops 385*a* and 385*b* of the first and second portions 310*a* and 310*b* to reciprocate over a pre-determined distance. The mechanical stops 485*a* and 485*b* and the slots 364 work in conjunction to provide a controlled kinematic motion which allow the first and second portions 310*a*-310*b* to open and close accordingly. The mechanical stops 385*a* and 385*b* may comprise welded reinforcements to provide additional load carrying capacity to the first and second portions 310*a*-310*b*. One embodiment of the mechanical stops is shown in FIGS. 4A and 4B.

Figure 4A:
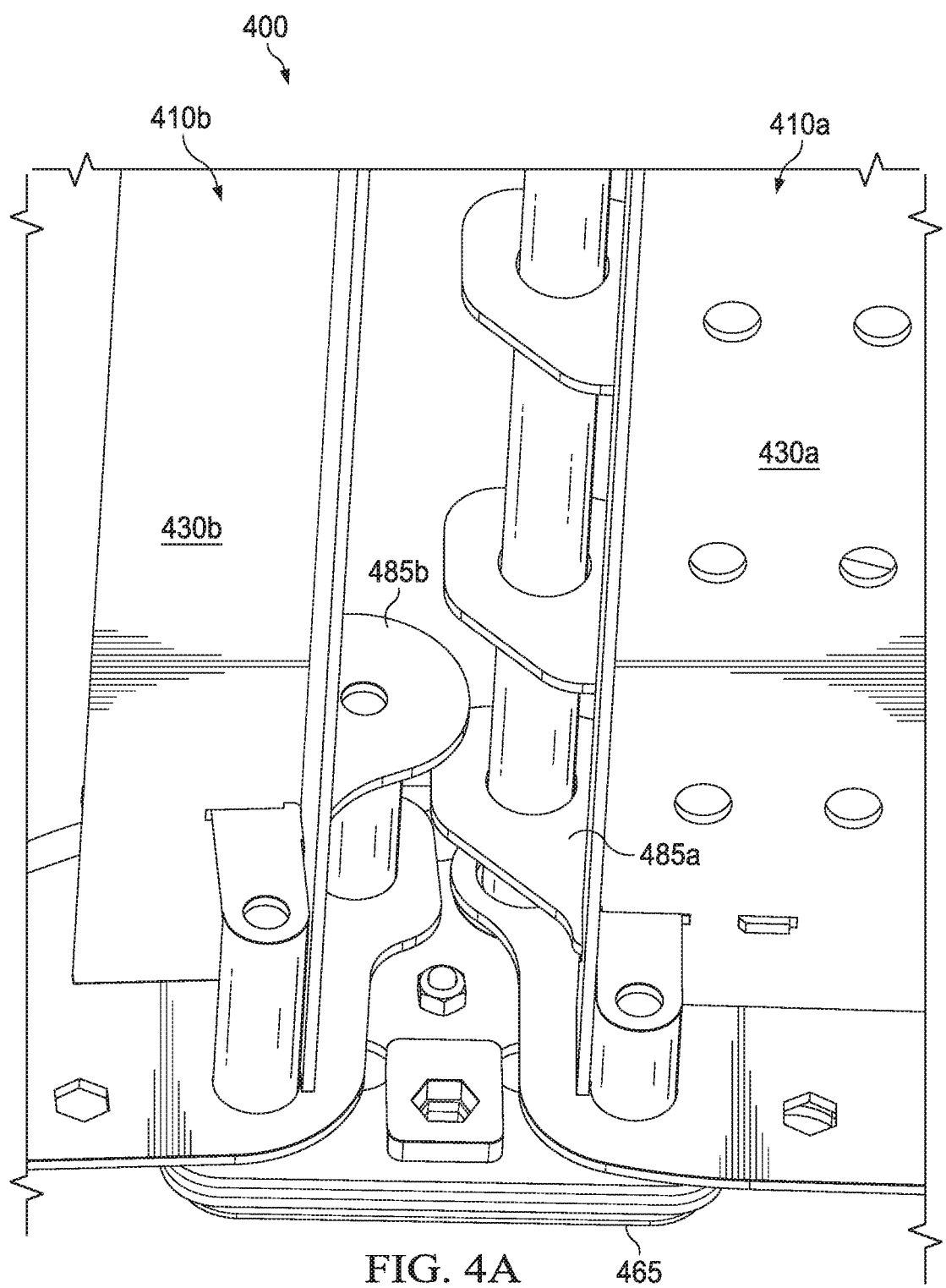
FIGS. 4A and 4B illustrate a mechanical stop feature of the collapsible product mover according to principles of the disclosure.
Figure 4B:
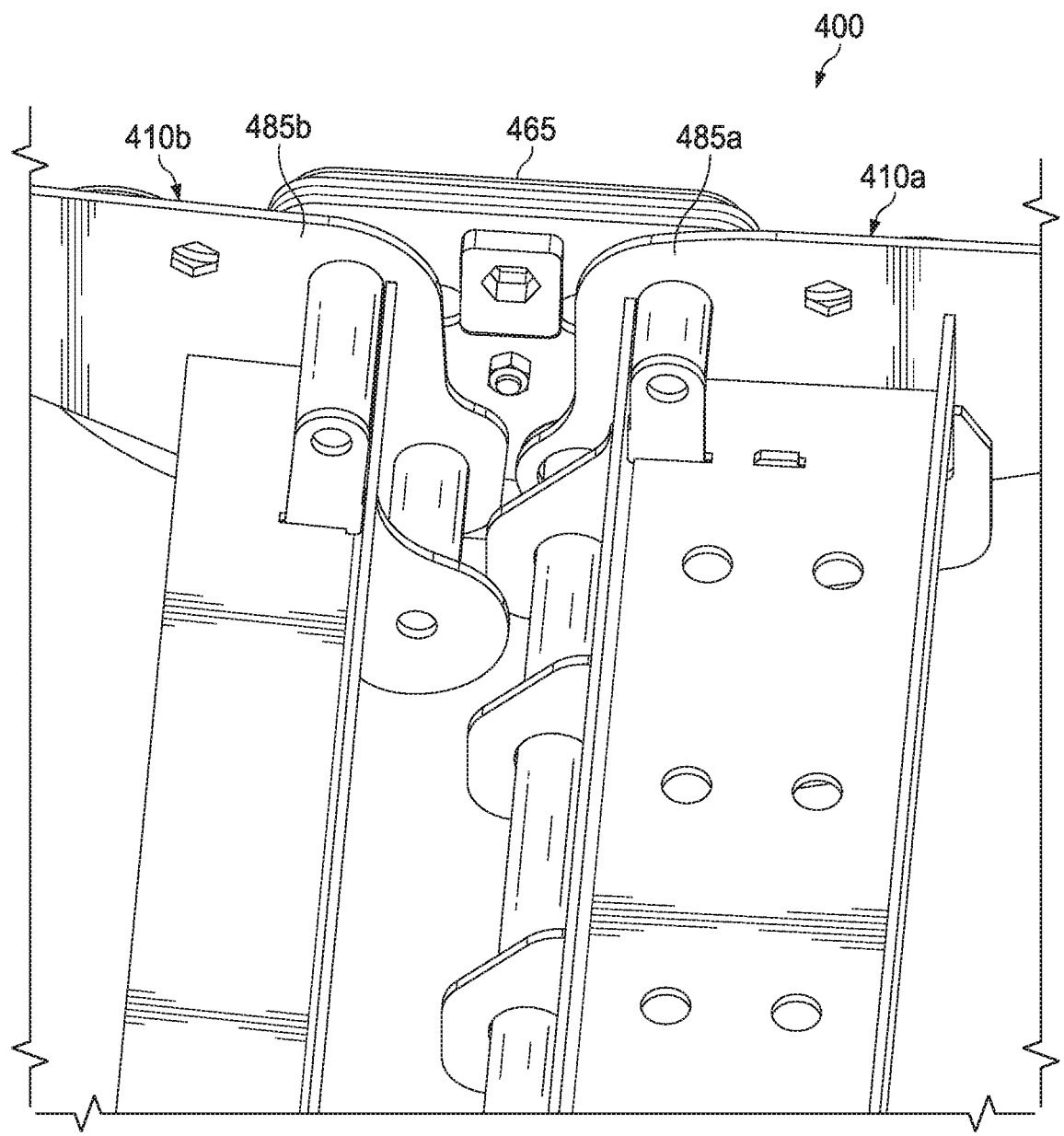

Referring now to FIGS. 4A and 4B, there is shown another embodiment of a product mover 400. Bottom sides 430*a* and 430*b* of a first portion 410*a* and second portion 410*ab*. The first and second portions 410*a* and 410*b* may include mechanical stops 485*a* and 485*b* which may be welded into the first and second portions 410*a* and 410*b*. The mechanical stops 485*a* and 485*b* may provide an adequate range of motion for the first and second portions 410*a* and 410*b* while preventing the product mover 400 from opening too far or failing due to excessive weight placed onto the product mover 400. The hinge 465, in some embodiments, may also provide a load bearing capacity of up to 410 lbs. (static loading) and/or 62 lbs. of peak load bearing capacity (cyclic loading) before yield. The hinge 465 may be designed to work with the mechanical stops 485*a* and 485*b* to enable the product mover 400 to carry the pre-determined sets of loads. The mechanical stops 485*a* and 485*b*, combined with the hinge may enable the product mover 400 to have a static load carrying capacity of up to about 410 lbs. and a cyclic load carrying capacity of up to about 62 lbs. Further, the product mover 400 may be designed to withstand about 4000 cycles of impact loading, which may, in some examples, equate to a field life of about 10 years.

While some embodiments of collapsible product movers may include at least first and second portions, there may be embodiments where additional portions may be coupled together in series to accommodate a greater length for the product mover. In such systems, each portion may fold in a different direction than the adjacent portion, similar to an according-type fold.

Sortation is an important step of order fulfillment and product moving systems. Product moving systems consume large volume in a retail floor, which raises the challenge of being able to conveniently move and store the equipment when not in use. Disclosed herein are aspects of a product moving and sortation system with folding/collapsible product movers that can easily be folded into a closed position before moving and storing in a simple and convenient way. The folding design however does not compromise the load carrying capacity of the product moving system. The at least first and second portions of the folding product movers are coupled via a hinge, which in some embodiments is a two-point hinge which connects the two frames of the first and second portions. In some embodiments, a hinged truss style support structure beneath at least one of the first and second portions provides support below the at least first and second portions to prevent cantilevering of the product mover when expanded. A two-point hinge may connect the first and second portions, and in some embodiments, may have at least two curved slots that engage two pivot points that provide a kinematic motion to the first and second portions required during opening and closing. Each of the first and second portions include welded mechanical stops that allow for improved load carrying capacity. The hinged support structure connects at one end to the bottom side of the first portion at one end and a support frame of a product transfer and sorting module on the other end, thereby preventing the first and second portions from collapsing when heavy loads are placed thereon. In some embodiments, the combination of the two-point hinge and the hinged support structure provides for a robust construction of the product mover module which provides superior load carrying capacity than previous product movers, such as, e.g., conveyor wings, in addition to providing a space saving advantage of a being foldable and easily maneuverable for flexibility and storage.

Those skilled in the art to which this application relates will appreciate that other and further additions, deletions, substitutions and modifications may be made to the described embodiments.

Embodiments of collapsible/foldable product movers disclosed herein may include the following aspects and features:

In one aspect, there may be a collapsible product mover, comprising: at least a first portion and a second portion coupled with the first portion, and one or more support members, wherein the first and second portions may be collapsed together. Each of the first and second portions may include a frame having a plurality of rollers coupled therein. The first and second portions may be coupled with a hinge, which in some embodiments may be a two-point hinge. The collapsible product mover may be used with a product sorting module and a support structure having one or more support members may be truss style hinged support legs which may couple onto the product sorting module. In other embodiments, the support structure may include one or more support members may include independent support legs or a support frame.

In another aspect, there may be a folding product mover conveyor, comprising: a first and second portion connected by a two-point hinge, and truss style hinged supports connected to a support frame of a product transfer module or frame of another product moving and transfer component, such as, e.g., a conveyor.

Certain features may include the following: In some embodiments, the two-point hinge includes two curved slots for providing a path for the wing stops to open to a certain length. In some embodiments, the length of the slots determines the degree of kinematic freedom that the wings may open and close. The first and second portions may include welded mechanical stops that allow the product mover to bear a pre-determined load in static and dynamic conditions. In some embodiments, the product mover may have a static load carrying capacity of up to about 410 lbs. and a cyclic load carrying capacity of up to about 62 lbs. for up to 4000 cycles of impact loading.

Aspects disclosed herein include:

A: A collapsible product mover, comprising: a first portion having proximal and distal end, and a top side and a bottom side; a second portion having a proximal and distal end, and a top side and a bottom side, wherein the proximal end of the second portion coupled with the distal end of the first portion; and a support structure beneath at least the first portion; wherein the first and second portions are configured to move between an open position and a folded position, wherein in the folded position the top side of the first portion faces the top side of the second portion.

B: A product moving system, comprising: at least one incoming conveyor; a product transfer module; and at least one collapsible product mover coupled with the product transfer module, including: a first portion having proximal and distal end, and a top side and a bottom side; a second portion having a proximal and distal end, and a top side and a bottom side, wherein the proximal end of the second portion coupled with the distal end of the first portion; and a support structure beneath at least the first portion; wherein the first and second portions are configured to move between an open position and a folded position, wherein in the folded position the top side of the first portion faces the top side of the second portion.

Aspects A, B, and C may have one or more of the following additional elements in combination:

Element 1: wherein the first portion couples with the second portion via a hinge;

Element 2: wherein the hinge is a 2 point hinge;

Element 3: wherein the first portion includes a frame and a plurality of rollers supported by the frame and the second portion includes a frame and a plurality of rollers supported by the frame;

Element 4: wherein the proximal end of the first portion removably couples with a product transfer module;

Element 5: wherein the support structure is a hinged truss having at least a first member and second member;

Element 6: wherein the first member of the support couples with a support frame of a product transfer module and the second member couples near the distal end of the first portion;

Element 7: wherein when in an open position, the first and second portions span a distance of about 10 feet;

Element 8: further comprising a locking mechanism, for maintaining the first and second portions together when in the folded position;

Element 9: wherein the first portion includes a mechanical stop on the bottom side, located proximate the distal end, such that the first portion can bear a pre-determined weight load of at least 410 pounds;

Element 10: wherein the second portion includes a mechanical stop on the bottom side, located proximate the proximal end, such that the second portion can bear a pre-determined weight load of at least 410 pounds; and Element 11: further comprising at least a second collapsible product mover, wherein the product transfer module includes a first shuttle, a second shuttle, and a cam system for raising and lowering the first and second shuttles; wherein the first shuttle directs product flow along a first flow path onto the at least one collapsible product mover and the second shuttle directs product flow in a second flow direction onto the second collapsible product mover.

What is claimed is:

1. A collapsible product mover, comprising:
   a first portion having proximal and distal end, and a top side and a bottom side, wherein a first mechanical stop is positioned on the bottom side of the first portion proximate the distal end of the first portion;
   a second portion having a proximal and distal end, and a top side and a bottom side, wherein a second mechanical stop is positioned on the bottom side of the second portion proximate the proximal end of the second portion;
   a hinge coupling the proximal end of the second portion with distal end of the first portion, the hinge including:
   a body;
   a first slot configured to engage the first mechanical stop positioned on the bottom side of the first portion; and
   a second slot configured to engage the second mechanical stop positioned on the bottom side of the second portion; and
   a support structure beneath at least the first portion;
   wherein the first and second portions are configured to move between an open position and a folded position, wherein in the folded position the top side of the first portion faces the top side of the second portion.

2. The collapsible product mover according to claim 1, wherein the hinge further includes a safety cover.

3. The collapsible product mover according to claim 1, wherein the hinge is a 2 point hinge.

4. The collapsible product mover according to claim 1, wherein the first portion includes a frame and a plurality of rollers supported by the frame and the second portion includes a frame and a plurality of rollers supported by the frame.

5. The collapsible product mover according to claim 1, wherein the proximal end of the first portion removably couples with a product transfer module.

6. The collapsible product mover according to claim 1, wherein the support structure is a hinged truss having a first member and second member.

7. The collapsible product mover according to claim 6, wherein the first member of the support couples with a support frame of a product transfer module and the second member couples near the distal end of the first portion.

8. The collapsible product mover according to claim 1, wherein when in an open position, the first and second portions span a distance of about 10 feet.

9. The collapsible product mover according to claim 1, further comprising a locking mechanism, for maintaining the first and second portions together when in the folded position.

10. The collapsible product mover according to claim 1, wherein the first portion can bear a pre-determined weight load of at least 410 pounds.

11. The collapsible product mover according to claim 1, wherein the second portion can bear a pre-determined weight load of at least 410 pounds.

12. A product moving system, comprising:
 at least one incoming conveyor;
 a product transfer module; and
 at least one collapsible product mover coupled with the product transfer module, including:
  a first portion having proximal and distal end, and a top side and a bottom side, wherein a first mechanical stop is positioned on the bottom side of the first portion proximate the distal end of the first portion;
  a second portion having a proximal and distal end, and a top side and a bottom side, wherein a second mechanical stop is positioned on the bottom side of the second portion proximate the proximal end of the second portion;
  a hinge coupling the proximal end of the second portion with distal end of the first portion, the hinge including:
   a body;
   a first slot configured to engage the first mechanical stop positioned on the bottom side of the first portion; and
   a second slot configured to engage the second mechanical stop positioned on the bottom side of the second portion; and
  a support structure beneath at least the first portion;
 wherein the first and second portions are configured to move between an open position and a folded position, wherein in the folded position the top side of the first portion faces the top side of the second portion.

13. The product moving system according to claim 12, wherein the first portion includes a frame and a plurality of rollers supported by the frame and the second portion includes a frame and a plurality of rollers supported by the frame.

14. The product moving system according to claim 12, wherein the proximal end of the first portion removably couples with a product transfer module.

15. The product moving system according to claim 12, wherein the hinge further includes a safety cover.

16. The product moving system according to claim 12, wherein the hinge is a 2 point hinge.

17. The product moving system according to claim 12, wherein the support structure is a hinged truss having a first member and second member.

18. The product moving system according to claim 17, wherein the first member of the support couples with a support frame of the product transfer module and the second member couples near the distal end of the first portion.

19. The product moving system according to claim 12 wherein the first portion can bear a pre-determined weight load of at least 410 pounds, and wherein the second portion can bear a pre-determined weight load of at least 410 pounds.

20. The product moving system according to claim 12, further comprising at least a second collapsible product mover, wherein the product transfer module includes a first shuttle, a second shuttle, and a cam system for raising and lowering the first and second shuttles; wherein the first shuttle directs product flow along a first flow path onto the at least one collapsible product mover and the second shuttle directs product flow in a second flow direction onto the second collapsible product mover.

* * * * *